United States Patent [19]

Morrow

[11] Patent Number: 4,776,888
[45] Date of Patent: Oct. 11, 1988

[54] SEALING COMPOSITION FOR INFLATABLE ARTICLES CONTAINING GAS UNDER PRESSURE

[76] Inventor: Raymond V. Morrow, 2148 Amlisa Dr., Nazareth, Pa. 18064

[21] Appl. No.: 91,063

[22] Filed: Aug. 28, 1987

[51] Int. Cl.$^4$ .............................................. C09K 3/10
[52] U.S. Cl. ...................................... 106/33; 152/504
[58] Field of Search ............................ 106/33; 252/72; 152/504

[56] References Cited

U.S. PATENT DOCUMENTS

| 3,352,696 | 11/1967 | Wallace | 106/33 |
| 3,920,061 | 11/1975 | Japp et al. | 152/504 |
| 3,931,843 | 1/1976 | Edwards et al. | 152/158 |
| 4,294,730 | 10/1981 | Kenny | 152/504 |
| 4,439,561 | 3/1984 | Barber | 106/33 |

FOREIGN PATENT DOCUMENTS 767168  1/1957  United Kingdom .................. 106/33

Primary Examiner—Theodore Morris
Attorney, Agent, or Firm—Allen D. Gutchess, Jr.

[57] ABSTRACT

A sealing system and sealing composition are provided for inflatable articles containing air under pressure. The sealing composition includes particles or particulates of shapes having sharp corners thereon which tend to dig into the article around the opening and wedge themselves therein. The sealing composition also includes fibers, at least some of which are fibrillated. The fibers tend to wrap around the particles and further plug the leak opening. The particles and the fibers are in a liquid carrier which also tends to form a bond of the particles and fibers in the leak opening. The particles in the composition are of particular ranges of sizes for different articles, the larger particles being used in larger articles, such as large tires for construction machines, for example.

5 Claims, No Drawings

SEALING COMPOSITION FOR INFLATABLE ARTICLES CONTAINING GAS UNDER PRESSURE

This invention relates to a sealing composition for inflatable articles containing super-atmospheric gas.

A large number of compositions have heretofore been known which are intended to seal leaks in pneumatic tires and such compositions have been used with varying degrees of success. Some of the compositions have been reasonably effective for sealing leaks if a puncture occurs in a relatively short period of time after the composition is applied to the interior of the tire. Effectiveness diminishes, however, over a period of time due to evaporation of some of the composition, separation of the solids from the liquid, chemical interreaction between components of the composition, or mechanical dissipation of the material by spreading too thinly on the interior walls of the tire after extended periods of use. Other compositions have tended to sag and form lumps or masses within the tire that cause the tire to become unbalanced, particularly at higher speeds of the automobile.

Some of the sealing compositions have also tended to congeal or solidify at lower temperatures so that the sealing effectiveness is substantially non-existent at low temperatures, during winter operation of the vehicle. On the other hand, other compositions have been essentially destroyed or rendered ineffective at high temperatures because of chemical interaction or evaporation. Also, the viscosity of the composition may be reduced in hot weather to the point that the composition does not block or seal a puncture but is simply forced through the opening by the pressure within the tire.

Heretofore, sealing compositions which have been effective for pin-hole leaks and small punctures are not effective for larger punctures. Some compositions which are fairly effective with automobile tires may not work well with truck tires which contain higher air pressure.

The present invention provides a sealing system which does not have the above-described disadvantages found in the sealants heretofore known. The new system forms a mechanical seal by providing a multiplicity of particles or particulates of shapes having sharp corners thereon in a wide range of sizes. When a leak in an article is formed, the air pressure therein forces the particles into the leak opening and wedges them against the surface of the article around the opening.

The composition also includes fibers, at least some of which are fibrillated, as by being ball-milled, to further fiberize the fibers. The ends of fibers, for example, can be treated to produce a plurality of fibrous ends thereon by such a treatment. After the particles are wedged in the opening, the fibers wrap around the particles and the mass wedges more fully mechanically in the opening by air tending to escape therethrough and by movement of the walls of the tire on the supporting surface during operation of the vehicle.

The composition further includes ethylene glycol as a carrier for the fibers and the particles. In addition, gums, adhesives, anti-rust ingredients and anti-corrosion ingredients are employed with the ethylene glycol carrier, as has heretofore been known.

In a preferred form, the sealing composition can be made in a plurality of grades for a plurality of applications. For example, the composition can be formulated for basketballs, footballs, and the like at one end of the range, being supplied in one-ounce syringes. At the other end of the range, the composition can be formulated for use in construction tires and tires for over-the-road machines and mining machines, being supplied in fifty-five gallon drums. In between, special formulations can be made for bicycle tires, small tires for lawn and garden tractors, forklifts, tires with thirteen to fifteen inch rims, tires with fifteen to nineteen inch rims, and tires with rims exceeding nineteen inches, by way of example. Further, the sealing compositions for the particular applications and customers can be dyed to diffent colors to make the particular grade readily apparent. Typically, the sealant is supplied to the tire through the tire valve, after the valve core is first removed.

The particles in the sealing composition are the most important single ingredient which contributes the most to the effectiveness of the sealant. The particles are of polyethylene or polycarbonate and have sharp corners thereon, being of triangular, preferably isosceles, shape. The size of the particles is also important for particular applications. For heavy-duty applications most of the particles pass through an eight-mesh screen and are held by a ten-mesh screen, ninety-eight percent passing through the eight-mesh screen and two percent passing through the ten-mesh screen. Particles of this size are particularly suitable for very large tires as used in construction machines and over-the-road and mining machines.

At the other end of the range, the particles are sized so that most pass through an eighteen mesh screen and are held by a twenty-mesh screen, ninety-eight percent passing through the eighteen-mesh screen and two percent passing through the twenty-mesh screen. Particles of this size are particularly suited for inflatable balls such as basketballs, footballs, and soccerballs, and also for bicycle tires. Slightly larger-sized particles are employed for small tires with four to twelve inch rims, for example, such as useds on lawn and garden tractors, golf carts, and trailers. Generally speaking, the larger the tire or article, the larger the size of particles employed, up to the eight/ten-mesh screen sizes discussed above.

The fibers employed in the sealing composition are also an important ingredient thereof. When a leak in the form of an opening occurs in the inflated article, the air under pressure tends to force the sealant through the opening. The particles with their sharp corners wedge in the opening, with the corners digging into the surface of the article at the opening. These particles tend to form a dam in the opening and fibers, which tend to pass out the opening under the pressure of the air, wrap around the particles to substantially close off the opening. The liquid carrier then tends to form a binder for the particles and fibers to complete the sealing off of the opening. The fibers need not all be of one material but, preferably, at least a portion of them are of cotton and are fibrillated in a ball-mill to produce fibrous ends on the fibers. The fibers are preferably from one and one-half to three millimeters in length and are present in a quantity, by weight, of several times the quantity of the particles. The particles and fibers in combination produce a high packing index or packing structure for the sealing composition.

The liquid carrier for the solid particles and fibers primarily comprises ethylene glycol. However, the liquid carrier also includes gums, adhesives, corrosion and rust inhibitors, anti-oxidants, and anti-bacterial agents, all of which have been employed in sealing compositions heretofore known.

By way of illustration, the sealing composition according to the invention includes a multiplicity of particles of plastic material, with the particles being present in an amount of about one to about ten parts, by weight, and preferably two to four parts, by weight, and in a size ranging from eight to twenty-mesh, as measured by Tyler screen sizes. The composition further includes a multiplicity of fibrillated fibers, being present in an amount from about six to about sixteen parts, by weight, preferably from ten to twelve parts, by weight, and having a length from about one-half to about six millimeters and preferably from one and one-half to three millimeters. A liquid carrier comprising ethylene glycol, gums, adhesives, corrosion and rust inhibitors, antioxidants, and anti-bacterial agents is present in an amount from about eighty to about ninety-two parts, by weight, and preferably about eighty-four to about eighty-eight parts, by weight.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A sealing composition for sealing a leak opening in an inflatable article containing air under pressure, said composition comprising a multiplicity of triangular particles each having shapes with a plurality sharp corners thereon, a multiplicity of fibers, and a liquid carrier, said particles being of a size to block the leak opening, said fibers being wrapped on the particles in the leak opening, and said liquid forming a binder to bind the particles and fibers at the opening.

2. A sealing composition for inflatable articles containing gas under pressure, said composition comprising a multiplicity of particles of polyethylene or polycarbonate, said particles being of triangular shapes having sharp corners thereon, said particles being present in an amount of two to four parts, by weight, and in a size from eight to twenty-mesh, as measured by Tyler screen sizes, a multiplicity of fibrillated fibers in lengths from one and one-half to three millimeters and being present in an amount of ten to twelve parts, by weight, and a carrier comprising ethylene glycol, gums, adhesives, corrosion and rust inhibitors, anti-oxidant agents and anti-bacterial agents, being present in an amount from eighty-four to eighty-eight parts, by weight.

3. A sealing composition for inflatable articles containing gas under pressure, said composition comprising a multiplicity of particles of triangular plastic material, said particles being of shapes each having a plurality of sharp corners thereon, said particles being present in an amount of one to ten parts, by weight, and in a size from eight to twenty-mesh, as measure by Tyler screen sizes, a multiplicity of fibrillated fibers in lengths from one-half to six millimeters, and being present in an amount of six to sixteen parts, by weight, and a carrier comprising ethylene glycol, gums, adhesives, corrosion and rust inhibitors, in an amount of eighty to ninety-two parts, by weight.

4. A sealing composition according to claim 3 for use with inflatable articles such as basketballs, football, soccerballs, and bicycle tires, most of said particles being present in a size from eighteen to twenty-mesh, as measured by Tyler screen sizes.

5. A sealing composition according to claim 3 to inflatable articles such as large tires for construction machines and over-the-road and mining machines, most of said particles being present in a size from eight to ten-mesh, as measured by Tyler screen sizes.

* * * * *